United States Patent
Nummila-Pakarinen et al.

(10) Patent No.: US 10,328,678 B2
(45) Date of Patent: Jun. 25, 2019

(54) FILMS

(71) Applicant: BOREALIS AG, Vienna (AT)

(72) Inventors: Auli Nummila-Pakarinen, Porvoo (FI); Peter Niedersuess, Ried/Riedmark (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/037,470

(22) PCT Filed: Nov. 19, 2014

(86) PCT No.: PCT/EP2014/075044
§ 371 (c)(1),
(2) Date: May 18, 2016

(87) PCT Pub. No.: WO2015/075081
PCT Pub. Date: May 28, 2015

(65) Prior Publication Data
US 2016/0271917 A1     Sep. 22, 2016

(30) Foreign Application Priority Data

Nov. 21, 2013 (EP) .................................. 13193931

(51) Int. Cl.
*B32B 27/32* (2006.01)
*B29C 48/00* (2019.01)
*B29C 55/06* (2006.01)
*B29K 23/00* (2006.01)

(52) U.S. Cl.
CPC .......... *B32B 27/32* (2013.01); *B29C 48/0018* (2019.02); *B29C 55/06* (2013.01); *B32B 27/327* (2013.01); *B29K 2023/0625* (2013.01); *B29K 2995/0051* (2013.01); *B29K 2995/0081* (2013.01); *B32B 2250/03* (2013.01); *B32B 2250/242* (2013.01); *B32B 2270/00* (2013.01); *B32B 2307/516* (2013.01); *B32B 2307/558* (2013.01); *B32B 2307/5825* (2013.01); *B32B 2439/46* (2013.01); *B32B 2439/70* (2013.01); *B32B 2439/80* (2013.01)

(58) Field of Classification Search
CPC ............................ B29C 47/0057; B29C 55/06; B32B 2250/03; B32B 2250/242; B32B 2270/00; B32B 2307/516; B32B 2307/558; B32B 2307/5825; B32B 2439/46; B32B 2439/70; B32B 2439/80; B32B 27/32; B32B 27/327

USPC .................................................. 428/212, 220
See application file for complete search history.

(56) References Cited

U.S. PATENT DOCUMENTS

2003/0144426 A1    7/2003   Williams et al.

FOREIGN PATENT DOCUMENTS

| EP | 0810235 | 12/1997 |
|---|---|---|
| EP | 1333044 | 8/2003 |
| EP | 1472298 | 9/2005 |
| EP | 1941999 | 12/2006 |
| EP | 1941998 | 7/2008 |
| EP | 2860031 | 4/2015 |
| WO | 1995035323 | 6/1995 |
| WO | 1999051646 | 10/1999 |
| WO | 2001055230 | 8/2001 |
| WO | 2004000933 | 12/2003 |
| WO | 2008074492 | 6/2008 |
| WO | 2008074493 | 6/2008 |

OTHER PUBLICATIONS https://www.exxonmobilchemical.com/en/products-and-services/polyethylene/plastomers, 2003-2017.*
International Search Report and Written Opinion for PCT/EP2014/075044 dated Feb. 6, 2015.
State Intellectual Property Office of China, Office Action and English Translation, dated Apr. 1, 2017.

* cited by examiner

*Primary Examiner* — Lawrence D Ferguson
(74) *Attorney, Agent, or Firm* — Gardner Groff Greenwald & Villanueva, PC

(57) ABSTRACT

A multilayer machine direction oriented film comprising at least an (A) layer and (B) layer, at least one of said (A) layer or (B) layer comprising at least 50 wt % of a multimodal linear low density polyethylene (LLDPE) having a density of 905 to 940 kg/m$^3$ and an MFR$_2$ of 0.01 to 20 g/10 min and comprising a lower molecular weight (LMW) component and a higher molecular weight (HMW) component; wherein said LMW component is an ethylene homopolymer and said HMW component is an ethylene polymer of ethylene with at least two C4-12 alpha olefins; wherein said film is a stretched film which is uniaxially oriented in the machine direction (MD) in a draw ratio of at least 1:3 and has a film thickness of at least 40 microns (after stretching) and wherein said film does not comprise a layer in which more than 50 wt % of said layer comprises a polymer component having a melting point (Tm) of 100° C. or less.

14 Claims, No Drawings

FILMS

This invention relates to machine direction oriented films with excellent mechanical properties, in particular high tear strength in the machine direction, that comprise a particular multimodal linear low density polyethylene that has been formed into a film and uniaxially stretched in the machine direction (MDO films). In particular, the invention relates to the formation of monolayer or multilayer MDO films using a particular multimodal LLDPE which surprisingly provides high tear strength at certain post stretching film thicknesses. The invention also provides a process for forming these machine direction oriented films and articles packaged using the films.

BACKGROUND OF THE INVENTION

The use of machine directional oriented (MDO) films made from polyethylene is well known. These films are generally produced to down gauge existing blown film recipes. This means less polymer film is required to achieve a target end use.

Linear low density polyethylenes (LLDPEs) such as Borlite OPE grades from Borealis enable down gauging as they give extremely high mechanical strength after the MDO step. However, even these film grades can still be improved upon. A problem with MDO film is a tendency to split in the machine direction. We have all observed a package splitting and watched that split propagate down the package, leaving the contents of the package spilled.

The present inventors therefore sought a solution to the problem of tear without compromising other properties of the film, in particular the impact strength of the film. The inventors have found that by using a certain multimodal LLDPEs, tear can be markedly improved without significantly compromising the mechanical properties of the film, e.g. in terms of impact strength. The increase in tear is only observable however in MDO films of a particular minimum thickness.

Higher film thicknesses however typically brings its own problems. Thicker films tends to mean increasing orientation, in particular with high molecular weight material. The increasing orientation in thicker films e.g. 60 μm films is characterised by low Elmendorf tear resistance in the machine direction. The combination therefore of good tear in thicker films is doubly challenging.

A further problem with MDO films is that in order to achieve a final film thickness of, for example, 60 to 80 μm, it is necessary to produce a primary film in the thickness of 360-480 μm. This results from the fact that the film is often stretched around 6 times in order to achieve the right balance of film stiffness and toughness. As the suitable process technology for the used materials is blown film, it is typically not possible to achieve such thicknesses with primary films. In order to achieve thicker films therefore, the blown film is "blocked" at the nip rolls. Typically therefore, where a film having an ABC type structure is used, layer C is the blocking layer. As the three layer coextruded film exits the die in the form of a bubble, the bubble is optionally cut and then two halves forced together to effectively form a ABC-CBA type structure. In this way, the film thickness is effectively doubled and the desired initial film thickness achieved. This is called film blocking in the art.

The materials used for the blocking layer are very soft polyethylene copolymers such an ethyl acrylates with low Vicat softening point and high stickiness. These could have negative impact on the final film properties e.g. when the blocking is not properly done (leading to air inclusion). In addition these polymer materials are rather expensive and therefore a significant cost contributor to the final film recipe. Another disadvantage is that only symmetric film constructions can be produced which is a disadvantage when it comes to sealing properties.

Surprisingly, the present inventors have found that when using a particular multimodal LLDPE in MDO films, it is possible to achieve a thick primary film and thus avoid the use of a blocking layer completely. With the right balance of high and low molecular weight components, and an appropriate density, a thick primary film with thickness of, for example, 240 μm or more can be produced, which still provides, after stretching, high mechanical strength, in terms of dart drop and stiffness. The polymer also possesses excellent Elmendorf tear in the machine direction.

This also allows the manufacturer to produce asymmetric films which give e.g. a broader sealing range together with high mechanical strength.

The use of LLDPE materials in MDO films is not new. In EP-A-1941998 an MDO film is described in which the outer layer is formed from a blend of Ziegler Natta multimodal LLDPE and a metallocene produced LLDPE. The films described are multilayer films.

In EP-A-1941999, the outer layer of the MDO films described also contains a blend of in an MDO film comprises a blend of Ziegler Natta multimodal LLDPE and a metallocene produced LLDPE. The films are again multilayer and comprise a (C) layer formed from an acrylate.

Moreover, the multimodal LLDPE of use in this invention, based on a homopolymer component and a terpolymer component is not itself new. It is generically suggested in references such as those above and described in EP-A-1333044 or EP-A-1472298 for use in injection moulding. The use however of the multimodal LLDPE defined herein in the specific MDO films defined herein is new.

SUMMARY OF INVENTION

Viewed from one aspect the invention provides a monolayer machine direction oriented film comprising at least 50 wt % of a multimodal linear low density polyethylene (LLDPE) having a density of 905 to 940 kg/m$^3$ and an MFR$_2$ of 0.01 to 20 g/10 min which comprises a lower molecular weight (LMW) component and a higher molecular weight (HMW) component;

wherein said LMW component is an ethylene homopolymer and said HMW component is an ethylene terpolymer of ethylene with at least two C4-12 alpha olefins;

said film being a stretched film which is uniaxially oriented in the machine direction (MD) in a draw ratio of at least 1:3 and having a film thickness of at least 40 microns (after stretching).

Viewed from another aspect the invention provides a multilayer machine direction oriented film comprising at least an (A) layer and (B) layer, at least one of said (A) layer or (B) layer comprising at least 50 wt % of a multimodal linear low density polyethylene (LLDPE) having a density of 905 to 940 kg/m$^3$ and an MFR$_2$ of 0.01 to 20 g/10 min which comprises a lower molecular weight (LMW) component and a higher molecular weight (HMW) component;

wherein said LMW component is an ethylene homopolymer and said HMW component is an ethylene terpolymer of ethylene with at least two C4-12 alpha olefins;

wherein said film is a stretched film which is uniaxially oriented in the machine direction (MD) in a draw ratio of at least 1:3 and has a film thickness of at least 40 microns (after stretching) and wherein said film does not comprise a layer in which more than 50 wt % of said layer comprises a polymer component having a melting point (Tm) of 100° C. or less.

Viewed from another aspect the invention provides a multilayer machine direction oriented film comprising at least an (A) layer and (B) layer, at least one of said (A) layer or (B) layer comprising at least 50 wt % of a multimodal linear low density polyethylene (LLDPE) having a density of 905 to 940 kg/m$^3$ and an MFR$_2$ of 0.01 to 20 g/10 min which comprises a lower molecular weight (LMW) component and a higher molecular weight (HMW) component;

wherein said LMW component is an ethylene homopolymer and said HMW component is an ethylene terpolymer of ethylene with at least two C4-12 alpha olefins;

wherein said film is a stretched film which is uniaxially oriented in the machine direction (MD) in a draw ratio of at least 1:3 and having a film thickness of at least 40 microns (after stretching) and wherein said film does not comprise a layer in which more than 50 wt % of said layer comprises an ethylene (meth(acrylate) polymer component.

In a preferred embodiment, films of the invention comprise less than 5 wt %, such as 0 wt % of any acrylate containing component.

In a preferred embodiment, films of the invention comprise less than 5 wt %, such as 0 wt % of an ethylene (meth)acrylate polymer component.

All films of the invention are preferably at least 50 microns after stretching.

Viewed from another aspect the invention provides the use of a monolayer or multilayer film as hereinbefore defined in packaging.

Viewed from another aspect the invention provides process for the formation of a monolayer or multilayer film as hereinbefore defined comprising obtaining a multimodal linear low density polyethylene (LLDPE) as hereinbefore defined;

extruding said multimodal linear low density polyethylene (LLDPE) or a composition comprising said multimodal linear low density polyethylene (LLDPE) so as to form a layer in a monolayer or multilayer film, said film as a whole having a thickness of 240 microns or more wherein said film is not blocked;

uniaxially stretching said film in the machine direction (MD) in a draw ratio of at least 1:3 so as to form a film of at least 40 microns in thickness.

Viewed from another aspect the invention provides an article packaged using a film as hereinbefore defined.

Definitions

The term LLDPE means linear low density polyethylene herein.

The films of the invention are uniaxially oriented in the machine direction. They are not therefore biaxially oriented films.

The term blocked is used herein to specify that during film blowing, the film is not compressed on itself to form an ABCCBA type structure. The film of the invention is not therefore "double thickness".

DETAILED DESCRIPTION OF INVENTION

The MDO film of the invention must comprise at least a multimodal LLDPE of the invention. The multimodal LLDPE of the invention is one which has a density of 905 to 940 kg/m$^3$ and an MFR$_2$ of 0.01 to 20 g/10 min and comprises a lower molecular weight (LMW) component and a higher molecular weight (HMW) component;

wherein said LMW component is an ethylene homopolymer and said HMW component is an ethylene terpolymer of ethylene with at least two C4-12 alpha olefins.

It will be appreciated that in such an LLDPE, ethylene forms the major monomer unit present such as at least 80 wt % of the monomer residues present, such as at least 90 wt % or more.

It is preferred if the multimodal LLDPE of the invention forms the most abundant polymer present within the MDO film as a whole, i.e. it has the largest weight percentage. Ideally, at least 40 wt % of the MDO film is formed from a multimodal LLDPE, preferably at least 50 wt %, such as at least 70 wt %, preferably at least 80 wt %.

Where the film of the invention is a monolayer film, the film can consist essentially of the multimodal LLDPE of the invention.

Where the film of the invention is a multilayer film, a layer of that film can consist essentially of the multimodal LLDPE of the invention.

The LLDPE of use in this invention is multimodal. The term "multimodal" means multimodal with respect to molecular weight distribution and includes also therefore bimodal polymers.

Usually, a LLDPE composition, comprising at least two polyethylene fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, the term multimodal polymer includes so called "bimodal" polymers consisting of two fractions. The form of the molecular weight distribution curve, i.e. the appearance of the graph of the polymer weight fraction as a function of its molecular weight, of a multimodal polymer, e.g. LLDPE, will show two or more maxima or at least be distinctly broadened in comparison with the curves for the individual fractions.

Ideally, the molecular weight distribution curve for multimodal polymers of the invention will show two distinction maxima.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In any multimodal LLDPE, there is by definition a lower molecular weight component (LMW) and a higher molecular weight component (HMW). The LMW component has a lower molecular weight than the higher molecular weight component. This difference is preferably at least 5000 g/mol.

In the multimodal LLDPE of use in this invention, there must be two comonomers present in the HMW component, i.e. it is a terpolymer component. Furthermore, the lower molecular weight (LMW) component is an ethylene homopolymer.

The multimodal LLDPE of the invention is therefore one in which the HMW component comprises repeat units deriving from ethylene and at least two other $C_{4-12}$ alpha olefin monomers such as 1-butene and one $C_{6-12}$ alpha olefin monomer. Ethylene preferably forms the majority of the HMW component.

The overall comonomer content in the total polymer is preferably 0.5 to 8.0% by mol, preferably 0.7 to 6% by mol, more preferably 1.0 to 4% by mol and most preferably 1.5 to 3% by mol.

Butene is preferably present in an amount of 0.2 to 2.5% by mol, such as 0.4 to 2% by mol, more preferably 0.5 to 1.5% by mol and most preferably 0.6 to 1% by mol.

The C6 to C12 alpha olefin is preferably present in an amount of 0.3 to 5.5% by mol, preferably 0.4 to 4% by mol, more preferably 0.7 to 3. % by mol and most preferably 1 to 2.4% by mol, especially 1.2 to 2% by mol.

Highly preferred values are about 0.8 mol % of C4 and 1.6 mol % of C6.

The multimodal LLDPE may be formed from ethylene along with at least two of 1-butene, 1-hexene or 1-octene. Preferably, the multimodal LLDPE, is a terpolymer with a homopolymer component and a terpolymer component, i.e. the polymer contains ethylene and two comonomers. Preferably, the multimodal LLDPE, comprises an ethylene butene hexene terpolymer HMW component and a LMW homopolymer component. The use of a terpolymer component of ethylene with 1-butene and 1-octene comonomers, or a terpolymer of ethylene with 1-octene and 1-hexene comonomers is also envisaged.

The multimodal LLDPE composition may have a density of 905-940 kg/m$^3$. The density is preferably 915 to 940 kg/m$^3$. Ideally, the multimodal LLDPE preferably has a density of 915 to 935 kg/m$^3$, ideally 920 to 935 kg/m$^3$.

The melt flow rate, $MFR_2$ of the multimodal LLDPE is preferably in the range 0.01 to 20 g/10 min, e.g. 0.05 to 10 g/10 min, preferably 0.1 to 6.0 g/10 min. The $MFR_2$ is highly preferably in the range of 0.10 to 5 g/10 min.

The $MFR_{21}$ of the multimodal LLDPE may be in the range 1 to 2000 g/10 min, e.g. 5 to 1000 g/10 min, preferably 10 to 600 g/10 min. The $MFR_2$ is highly preferably in the range of 10 to 500 g/10 min.

The Mw of the multimodal LLDPE, may be in the range 100,000 to 300,000, preferably 150,000 to 270,000. The Mw/Mn of the multimodal LLDPE may be in the range 10 to 30, preferably 10 to 25.

As stated above a multimodal LLDPE comprises at least a LMW component and a HMW component.

The LMW component of LLDPE preferably has a $MFR_2$ of at least 50, preferably 50 to 3000 g/10 min, more preferably at least 100 g/10 min. The molecular weight of the low molecular weight component should preferably range from 20,000 to 50,000, e.g. 25,000 to 40,000.

The density of the lower molecular weight component may range 940 to 975 kg/m$^3$, especially 960 to 972 kg/m$^3$.

The lower molecular weight component preferably forms from 30 to 70 wt %, e.g. 40 to 60% by weight of the multimodal LLDPE with the higher molecular weight component forming 70 to 30 wt %, e.g. 40 to 60% by weight.

The higher molecular weight component has a lower $MFR_2$ and a lower density than the lower molecular weight component.

The higher molecular weight component has preferably an $MFR_2$ of less than 1 g/10 min, preferably less than 0.5 g/10 min, especially less than 0.2 g/10 min, and a density of less than 915 kg/m$^3$, e.g. less than 910 kg/m$^3$, preferably less than 905 kg/m$^3$. The Mw of the higher molecular weight component may range from 100,000 to 1,000,000, preferably 250,000 to 500,000.

The multimodal LLDPE is preferably one formed using single site catalysis or a Ziegler Natta catalyst. Both these types of catalyst are well known in the art. The use of Ziegler Natta catalysts is preferred.

It is most preferred if the multimodal LLDPE comprises an ethylene homopolymer and an ethylene butene hexene copolymer component, ideally made by Ziegler Natta catalyst.

Preparation of Polymer

Multimodal (e.g. bimodal) polymers can be made by mechanical blending two or more, separately prepared polymer components or, preferably, by in-situ blending in a multistage polymerisation process during the preparation process of the polymer components. Both mechanical and in-situ blending are well known in the field.

Accordingly, preferred multimodal LLDPEs, are prepared by in-situ blending in a multistage, i.e. two or more stage, polymerization or by the use of two or more different polymerization catalysts, including multi- or dual site catalysts, in a one stage polymerization.

Preferably the multimodal LLDPE, is produced in at least two-stage polymerization using the same catalyst, e.g. a single site or Ziegler-Natta catalyst. Thus, for example two slurry reactors or two gas phase reactors, or any combinations thereof, in any order can be employed. Preferably however, the multimodal polymer, e.g. LLDPE, is made using a slurry polymerization in a loop reactor followed by a gas phase polymerization in a gas phase reactor.

A loop reactor-gas phase reactor system is marketed by Borealis as a BORSTAR reactor system. Any multimodal polymer, e.g. LLDPE, present is thus preferably formed in a two stage process comprising a first slurry loop polymerisation followed by gas phase polymerisation.

The conditions used in such a process are well known. For slurry reactors, the reaction temperature will generally be in the range 60 to 110° C. (e.g. 85–110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

Where the higher molecular weight component is made second in a multistage polymerisation it is not possible to measure its properties directly. However, the skilled man is able to determine the density, $MFR_2$ etc of the higher molecular weight component using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835.

The density is calculated from McAuley's equation 37, where final density and density after the first reactor is known.

$MFR_2$ is calculated from McAuley's equation 25, where final $MFR_2$ and $MFR_2$ after the first reactor is calculated. The use of these equations to calculate polymer properties in multimodal polymers is common place.

The multimodal LLDPE may be made using any conventional catalyst, such as a chromium, single site catalyst, including metallocenes and non-metallocenes as well known in the field, or Ziegler-Natta catalysts as is also known in the art. The preferred choice is a Ziegler Natta (znLLDPE).

Preferred Ziegler-Natta catalysts comprise a transition metal component and an activator. The transition metal component comprises a metal of Group 4 or 5 of the Periodic System (IUPAC) as an active metal. In addition, it may contain other metals or elements, like elements of Groups 2, 13 and 17. Preferably, the transition metal component is a solid. More preferably, it has been supported on a support material, such as inorganic oxide carrier or magnesium halide. Examples of such catalysts are given, among others in WO 95/35323, WO 01/55230, WO 2004/000933, EP 810235 and WO 99/51646.

Conventional cocatalysts, supports/carriers, electron donors etc can be used.

The polymers of use on the invention are however commercially available materials.

Films

The films of the invention can be multilayer films or monolayer films. In any multilayer film, the multimodal LLDPE of the invention forms at least 50 wt % of a layer within such a multilayer film. If a film comprises 3 or more layers, the multimodal LLDPE is preferably present in a core layer of the film (i.e. not an outer layer). In one embodiment, it is preferred if the multimodal LLDPE of the invention is present in one layer of a multilayer film only.

In its simplest embodiment, the present invention covers a film which is a monolayer MDO film comprising, e.g. consisting essentially of, a multimodal LLDPE as herein described. The multimodal LLDPE is preferably the major component. Ideally, the multimodal LLDPE forms at 60 to 100 wt % of the monolayer film, such as 60 to 90 wt % or 80 to 99 wt %. It will be appreciated that the film may also contain some additives.

In a preferred embodiment, a monolayer film comprises the multimodal LLDPE of the invention along with a sealing component such as a plastomer. Such a plastomer may form 10 to 40 wt % of the monolayer film. The nature of the plastomer is defined further below.

In a multilayer film, the multimodal LLDPE forms at least 50 wt % of a layer within said film, such as at least 70 wt % of that layer such as at least 80 wt % of that layer. Ideally the layer consists essentially of the multimodal LLDPE.

If other layers are present, such layers may comprise other multimodal LLDPEs, unimodal LLDPEs, plastomers or another multimodal LLDPE of the invention. Ideally, no layer should contain more than 50 wt % of a polymer component with a melting point of less than 100° C. Alternatively viewed, the films of the invention should not contain a blocking layer at all.

If a multilayer film is present, it is preferred if that film consists of three layers. Films can be symmetrical or asymmetrical. It is preferred if the film is asymmetric. It is also preferred if no film of the invention is blocked (i.e. formed by collapsing the polymer bubble onto itself).

The term consist essentially of, in connection with the films or film layers of the invention, is used to indicate that the film or film layer in question contains the multimodal LLDPE as the only polyolefin component. The film or layer may however contain standard polymer additives, possibly added via a masterbatch. It will be appreciated that additives may be carried on polyolefins as a masterbatch and the addition of such supported additives is intended to be covered by the words "consisting essentially of". The levels of these additives are low, typically below 3 wt %.

The monolayer film can be formed by extrusion of the necessary polymers to form the film. Multilayer films are formed by coextrusion.

The invention preferably relates to a monolayer film or a multilayer film comprising at least layer (A) and a layer (B). Layer (B) preferably comprises the multimodal LLDPE of the invention.

Layer (A) preferably comprises another multimodal LLDPE (from hereon a further multimodal LLDPE) or a blend of a further multimodal LLDPE and a plastomer. Note that the further multimodal LLDPE cannot be a multimodal LLDPE of the invention.

Ideally layer (B) comprises at least 50 wt % of the multimodal LLDPE of the invention, ideally consists essentially of that multimodal LLDPE.

If films of the invention are 3-layered, films preferably comprise therefore at least layers (A), (B) and (C).

It is preferred if only one of the layers in a three layer film of the invention comprise a multimodal LLDPE of the invention. It is especially preferred if layer (B) of the film comprises the multimodal LLDPE of the invention.

In one embodiment, layers (A) and (C) are identical. Preferred multilayer films of the invention are however asymmetrical ABC films. Layer (C) preferably comprises another multimodal LLDPE or a blend of multimodal LLDPE and a plastomer.

Films may comprise conventional film additives, i.e. each layer independently may contain conventional film additives such as antioxidants, UV stabilisers, acid scavengers, nucleating agents, anti-blocking agents, slip agents etc as well as polymer processing agent (PPA) and so on.

The multimodal LLDPE of the invention may be blended with other polymer components in either a monolayer film construction or within one layer of a multilayer film construction. If a blend is used, it is preferred if the blending component is a plastomer. Plastomers of use in any film of the invention are preferably ethylene copolymers with a comonomer such as propylene, 1-butene, 1-hexene or 1-octene. In all circumstances the plastomer has a density of 905 $kg/m^3$ or less, preferably 902 $kg/m^3$ or less. Plastomers generally have a density of 865 $kg/m^3$ or higher such as 870 $kg/m^3$ or higher.

The plastomer is preferably a copolymer of ethylene and 1-butene, 1-hexene or 1-octene in which the ethylene forms the major component; or a copolymer of propylene and ethylene in which the propylene forms the major component. The content of ethylene is preferably 5 to 30 wt %, such as 7.5 to 20 wt % in the propylene ethylene copolymer. The content of octene in an ethylene octene plastomer is preferably 5 to 30 wt %, such as 7.5 to 20 wt % in the copolymer.

The plastomer is preferred one which contains random distribution of ethylene with the otherwise isotactic propylene chains. In can therefore be considered a random ethylene copolymer. It is not however a heterophasic copolymer.

The melt flow rate, $MFR_2$ of the plastomer is preferably in the range 0.01 to 20 g/10 min, e.g. 0.05 to 10 g/10 min, preferably 0.1 to 6.0 g/10 min.

Plastomers of the invention are ideally formed using metallocene type catalysts.

Plastomers of use in the invention are commercially available and can be bought from polymer suppliers and aid the sealing of the claimed films. An plastomer present is therefore present in a layer that can be sealed such as the (C) layer in a multilayer film.

The films of the invention may also comprise an HDPE component having a density of at least 940 kg/m³ such as 945 to 975 kg/m³.

The films of the invention may also comprise a further multimodal LLDPE different from the LLDPE of the invention such as conventional further multimodal LLDPEs available on the market. Such LLDPEs preferably comprise one comonomer only, often present in the HMW component. In such multimodal LLDPE's the lower molecular weight (LMW) component is preferably an ethylene homopolymer.

Alternatively, preferred multimodal LLDPEs with which the multimodal LLDPEs of the invention might be combined are based on a blend of two binary copolymer components, e.g. two ethylene butene copolymers or an ethylene butene lower molecular weight component and an ethylene hexene higher molecular weight component. It will be appreciated that in these multimodal LLDPEs it is preferred that no component of the polymer is a terpolymer.

Optional further multimodal LLDPEs may therefore comprise a homopolymer component and an ethylene 1-butene or ethylene 1-hexene copolymer component or comprise two ethylene/butene or ethylene/hexene copolymer components.

The optional further multimodal LLDPE composition may have a density of 905-940 kg/m³. The density is preferably 915 to 940 kg/m³. Ideally, the multimodal LLDPE preferably has a density of 915 to 935 kg/m³, ideally 920 to 935 kg/m³.

The melt flow rate, $MFR_2$ of the multimodal LLDPE is preferably in the range 0.01 to 20 g/10 min, e.g. 0.05 to 10 g/10 min, preferably 0.1 to 6.0 g/10 min. The $MFR_2$ is highly preferably in the range of 0.10 to 5 g/10 min.

The $MFR_{21}$ of the multimodal LLDPE may be in the range 5 to 500, preferably 10 to 200 g/10 min.

The Mw of the multimodal LLDPE, may be in the range 100,000 to 300,000, preferably 150,000 to 270,000. The Mw/Mn of the multimodal LLDPE may be in the range 10 to 30, preferably 10 to 25.

The further optional multimodal LLDPE is preferably one formed using single site catalysis or a Ziegler Natta catalyst. Both these types of catalyst are well known in the art. The use of Ziegler Natta catalysts is preferred.

It is most preferred if any further multimodal LLDPE comprises an ethylene homopolymer and an ethylene butene copolymer component, ideally made by a Ziegler Natta catalyst or comprises two ethylene butene copolymer components, ideally made by a Ziegler Natta catalyst.

Other polymer components that might be present include unimodal LLDPE's which have a single peak in the GPC curve and which are therefore produced in a single polymerisation step. Unimodal LLDPEs are preferably metallocene produced, i.e. they are synthesised using metallocene catalysis. This gives characteristic features to the polymer such as narrow Mw/Mn, even comonomer distribution (observable under TREF) and so on. These polymers will be called unimodal mLLDPE's herein.

As used herein, the unimodal LLDPE polymer is an ethylene copolymer having a density of 940 kg/m³ or less. Preferred unimodal LLDPE's may have a density of 905-940 kg/m³, more preferably 910 to 937 kg/m³, e.g. 935 kg/m³ or below. In one preferable embodiment even densities of 925 kg/m³ or below are highly feasible.

The unimodal LLDPE is formed from ethylene along with at least one C4-12 alpha-olefin comonomer, e.g. 1-butene, 1-hexene or 1-octene. Preferably, the unimodal LLDPE is a binary copolymer, i.e. the polymer contains ethylene and one comonomer, or a terpolymer, i.e. the polymer contains ethylene and two or three, preferably two, comonomers. Preferably, the unimodal LLDPE comprises an ethylene hexene copolymer, ethylene octene copolymer, ethylene butene copolymer or a terpolymer of ethylene with 1-butene and 1-hexene comonomers, a terpolymer of ethylene with 1-butene and 1-octene comonomers, or a terpolymer of ethylene with 1-octene and 1-hexene comonomers. The amount of comonomer present in the unimodal LLDPE is preferably 0.5 to 12 mol %, e.g. 2 to 10% mole, especially 4 to 8% mole.

The $MFR_2$ of unimodal LLDPE's is preferably in the 0.01 or more, preferably 0.1 to 20 g/10 min, e.g. 0.2 to 10, preferably 0.5 to 6.0, e.g. 0.7 to 4.0 g/10 min.

The unimodal LLDPE has preferably a weight average molecular weight (Mw) of 100,000-250,000, e.g. 110,000-160,000.

The unimodal LLDPE polymers preferably posses a narrow molecular weight distribution. The Mw/Mn value is preferably 2 to 8, e.g. 2.2 to 4.

Unimodal LLDPEs are well known commercial products.

It is preferred if the films of the invention are free of any high density polyethylene, i.e. a polyethylene homopolymer or copolymer with a C3-12 alpha olefin having a density of more than 940 kg/m³.

It is also preferred if the films of the invention are free of any ethylene (meth)acrylate polymers. It is a particular feature of the invention therefore that the use of a blocking layer is not required in this case. Ideally therefore layer (A) or (C) is not based on an ethylene acrylate polymer. Ideally, the (A) and/or (C) layer comprises less than 50 wt % of a polymer which has a melting point less than 100° C., such as an ethylene acrylate or ethylene vinyl acetate polymer.

It is also preferred if the films of the invention are free of an LDPE.

In preferred multilayer films of the invention:

Layer (A)

Accordingly, in a first preferable embodiment of the invention, said layer (A) comprises a further multimodal LLDPE as hereinbefore defined, optionally mixed with a plastomer. If a plastomer is present it may form 10 to 45 wt % of the layer. Layer (A) preferably consists essentially of a further multimodal LLDPE.

Layer (B)

Layer (B) preferably comprises at least 50 wt %, preferably at least 60 wt %, more preferably at least 70 wt % of a multimodal LLDPE of the invention. In some embodiments even about 80 wt % or more of multimodal LLDPE is preferred. Preferably said layer (B) consists of a multimodal LLDPE polymer(s) of the invention.

Layer (C)

Said layer (C) may have a polymer composition as described in relation to layer (A) above. Preferably layer (C) is however different from layer (A). In a preferable embodiment of the invention, said layer (C) comprises a further multimodal LLDPE as hereinbefore defined mixed with a plastomer. If a plastomer is present it may form 10 to 45 wt % of the layer. Layer (C) can therefore operate as a sealing layer.

The film thickness distribution (%) of a ABC layer film is preferably 20 to 40%/20-60%/20-40% of the total film thickness (100%).

Monolayer films preferably comprise at least 50 wt % of the multimodal polymer of the invention and a plastomer as herein defined, such as 10 to 40 wt % plastomer.

Film Preparation

Films are produced by extrusion through an annular die with a pressure difference applied to blow the extruded cylinder into a film and achieve the desired orientation within the film, i.e. to build a stress into the cooled film.

For film formation using polymer mixtures the different polymer components (e.g. within layers (A), (B) and optional (C)) are typically intimately mixed prior to extrusion and blowing of the film as is well known in the art. It is especially preferred to thoroughly blend the components, for example using a twin screw extruder, preferably a counter-rotating extruder prior to extrusion and film blowing.

The films of the invention are uniaxially oriented. That means that they are stretched in a single direction, the machine direction.

The preparation of a uniaxially oriented multilayer film of the invention comprises at least the steps of forming a layered film structure and stretching the obtained multilayer film in a draw ratio of at least 1:3, preferably at least 1:4.

Typically the compositions providing the layers of the film will be blown i.e. (co)extruded at a temperature in the range 160° C. to 240° C., and cooled by blowing gas (generally air) at a temperature of 10 to 50° C. to provide a frost line height of 1 or 2 to 8 times the diameter of the die. The blow up ratio should generally be in the range 1.2 to 6, preferably 1.5 to 4.

The obtained film is subjected to a subsequent stretching step, wherein the film is stretched in the machine direction. Stretching may be carried out by any conventional technique using any conventional stretching devices which are well known to those skilled in the art.

Importantly, the films of the invention are not made by a process in which the formed bubble is then collapsed e.g. in nip rolls to form said film where layers (A) are contacted inside/inside, i.e. ABA/ABA. In the present invention, the coextruded bubble may be collapsed and split into two films. The two films can then be stretched separately in a winding machine.

Stretching is preferably carried out at a temperature in the range 100-125° C. e.g. about 105° C. Any conventional stretching rate may be used, e.g. 2 to 40%/second.

The film is stretched only in the machine direction to be uniaxial. The effect of stretching in only one direction is to uniaxially orient the film.

The film is stretched at least 3 times, preferably 3 to 10 times, its original length in the machine direction. This is stated herein as a draw ratio of at least 1:3, i.e. "1" represents the original length of the film and "3" denotes that it has been stretched to 3 times that original length. Preferred films of the invention are stretched in a draw ratio of at least 1:4, more preferably between 1:5 and 1:8, e.g. between 1:5 and 1:7. An effect of stretching (or drawing) is that the thickness of the film is similarly reduced. Thus a draw ratio of at least 1:3 preferably also means that the thickness of the film is at least three times less than the original thickness.

Blow extrusion and stretching techniques are well known in the art, e.g. in EP-A-299750.

The film preparation process steps of the invention are known and may be carried out in one film line in a manner known in the art. Such film lines are commercially available.

The films of the invention typically have a starting (or original) thickness of 400 µm or less. The films should have a starting thickness of at least 240 microns. The stretched films of the invention must have a minimum thickness of 40 µm.

After stretching, the final thickness of the uniaxially oriented films, of the invention is typically 40 µm to 80 µm, more preferably 50 to 70 µm.

Film Properties

The films of the invention preferably have high stiffness measured as tensile modulus of at least 700 MPa in the machine direction and/or transverse direction.

The films of the invention may have a dart drop of at least 400 g, preferably at least 450 g. Ideally this is measured on a 60 micron film.

The films of the invention may have a tear resistance of at least 2.5 N in the MD, such as at least 3.0 N. Ideally this is measured on a 60 micron film.

Applications

The films of the invention are preferably used in packaging of household, food, healthcare or beverage products. The formation of heavy duty shipping sacks, lamination films and pouches is also preferred. In particular, the films are of use in form fill and seal applications, especially for fresh produce.

The invention will now be described with reference to the following non-limiting examples.

Determination Methods

Density of the materials is measured according to ISO 1183:1987 (E), method D, with isopropanol-water as gradient liquid. The cooling rate of the plaques when crystallising the samples was 15° C./min. Conditioning time was 16 hours.

Melt Flow Rate (MFR) or Melt Index (MI)

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Molecular Weights, Molecular Weight Distribution, Mn, Mw, MWD

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 μL of sample solution were injected per analysis. The column set was calibrated using universal calibration (according to ISO 16014-2:2003) with 10 narrow MWD polystyrene (PS) standards in the range of 1.05 kg/mol to 11 600 kg/mol. Mark Houwink constants were used for polystyrene and polyethylene (K: $19 \times 10^{-3}$ dL/g and a: 0.655 for PS, and K: $39 \times 10^{-3}$ dL/g and a: 0.725 for PE). All samples were prepared by dissolving 0.5-3.5 mg of polymer in 4 mL (at 140° C.) of stabilized TCB (same as mobile phase) and keeping for 2 hours at 140° C. and for another 2 hours at 160° C. with occasional shaking prior sampling in into the GPC instrument.

qComonomer Content (% wt and % mol) was determined by using $^{13}$C-NMR. The $^{13}$C-NMR spectra were recorded on Bruker 400 MHz spectrometer at 130° C. from samples dissolved in 1,2,4-trichlorobenzene/benzene-$d_6$ (90/10 w/w). Conversion between % wt and % mol can be carried out by calculation.

Impact Strength is determined on Dart-drop (g/50%). Dart-drop is measured using ISO 7765-1, method "A". A dart with a 38 mm diameter hemispherical head is dropped from a height of 0.66 m onto a film sample clamped over a hole. If the specimen fails, the weight of the dart is reduced and if it does not fail the weight is increased. At least 20 specimens are tested. The weight resulting in failure of 50% of the specimens is calculated and this provides the dart drop impact (DDI) value (g). The relative DDI (g/μm) is then calculated by dividing the DDI by the thickness of the film.

Tear resistance (determined as Elmendorf tear (N): Applies for the measurement both in machine direction and in transverse direction. The tear strength is measured using the ISO 6383/2 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film.

Tensile modulus (secant modulus, 0.05-1.05%) is measured according to ASTM D 882-A on film samples prepared as described under below "Film Sample preparation". The speed of testing is 5 mm/min. The test temperature is 23° C. Width of the film was 25 mm.

Example 1

The following polymers were used in the examples:

TABLE 1

|  | OPE792 | OPE795 | Engage 8100 | Affinity PL1880G | OPE797 | FX1001 |
| --- | --- | --- | --- | --- | --- | --- |
| Type | Multimodal znLLDPE C2/C4 | Mulitimodal znLLDPE C2/C4 | Ethylene acrylate | High density Plastomer* C2-C8 | Mulitimodal znLLDPE C2/C4 | Multimodal znLLDPE C2/C4/C6 |
| Density kg/m$^3$ | 923 | 931 | 870 | 902 | 935 | 931 |
| MFR$_2$ g/10 min | 0.2 | 0.2 | 1.0 | 0.85 | 0.6 | 0.9 |

*Outside claim 1

Film Preparation

Films having an ABC or AAA-structure were coextruded on a 7-layer Alpine coextrusion line with die diameter 300 mm, at a blow up ratio (BUR) of 1:2.5, frost line height 3D and Die gap 1.4 mm. The temperature settings on all extruders were A=210° C./B=210° C./C=210° C. and the temperature setting on the extruder die was 210° C. The formed films (ABBBBBC=ABC or AAAAAAA monolayer) have thicknesses as shown in Table 2 to 4.

Stretching was carried out using a monodirectional stretching machine manufactured by Hosokawa Alpine AG in Augsburg/Germany. The film obtained from blown film extrusion was pulled into the orientation machine then stretched between two sets of nip rollers where the second pair runs at higher speed than the first pair resulting in the desired draw ratio. Stretching is carried out with the draw ratios 1:6. After exiting the stretching machine the film is fed into a conventional film winder where the film is slit to its desired width and wound to form reels.

The film samples used for the determinations of general film properties as defined in the description were prepared as described above and had starting film thickness of 360 μm before stretching, draw ratio of 1:6, final film thickness of 60 μm after stretching and a thickness distribution (%) of 20/60/20 of the total film thickness.

TABLE 4

All films outside the invention as too thin

| Primary film 150 μm => 25 μm Test | Parameter | Unit | CE7 OPE795 | CE8 OPE797 | CE9 FX1001 |
|---|---|---|---|---|---|
| TENSILE FILM MD | TENSILE MODULUS | MPa | 806.24 | 1034.9 | 982.83 |
| TENSILE FILM TD | TENSILE MODULUS | MPa | 978.65 | 1273.8 | 1120.36 |
| ELMENDORF MD | THICKNESS | μm | 24 | 24 | 25 |
| | TEAR RESISTANCE | N | 3.15 | 3.26 | 3.36 |
| | RELATIVE TEAR RESISTANCE | N/mm | 130.04 | 133.63 | 137.16 |
| DDI | THICKNESS | μm | 25 | 25 | 25 |
| | F50 | g | 568 | 256 | 902 |

CE2, in which the film is blocked (ABCCBA), has the same tear properties as IE1 which is not blocked. This example therefore shows that blocking is not necessary with the films of the invention to achieve good tear.

It can be seen in table 4 that the tear resistance of the three films is rather similar. In contrast, in table 3, the tear resistance of IE2 is significantly higher than that of CE4-CE6 showing that the effect is observed only on thicker films.

TABLE 2

| | | | | CE1 | CE2 | CE3 | IE1 |
|---|---|---|---|---|---|---|---|
| Primary film | 360 μm => 60 μm | | A | OPE792 + 30% PL1880G | OPE792 + 30% PL1880G | OPE792 | OPE792 |
| | | | B | OPE795 | FX1001 | OPE797 | FX1001 |
| | | | C | Engage 8100 | Engage 8100 | OPE792 + 40% PL1880G | OPE792 + 40% PL1880G |
| | Parameter | | Unit | 2 × 180 μm | 2 × 180 μm | 360 μm | 360 μm |
| MDO step | TAKE OF SPEED | | m/min | 10 | 10 | 10 | 10 |
| | TEMPERATUR STRETCHING ROLL(6) | | ° C. | 105 | 105 | 115 | 115 |
| Tensile MD | TENSILE MODULUS | | MPa | 528.45 | 649.95 | 650.32 | 673.12 |
| Tensile TD | TENSILE MODULUS | | MPa | 694.4 | 782.82 | 865.02 | 815.98 |
| Elmendorf MD | TEAR RESISTANCE | | N | 0.93 | 2.73 | 1.23 | 2.68 |
| | RELATIVE TEAR RESISTANCE | | N/mm | 15.29 | 45.15 | 20.4 | 44.13 |
| DDI | F50 | | g | | | 329 | 430 |

TABLE 3

Monolayer films of the Invention

| Primary film | 360 μm => 60 μm Monolayer film | Unit | IE2 FX1001 | CE4 OPE795 | CE5 FB1355HN | CE6 OPE797 |
|---|---|---|---|---|---|---|
| | Final film thickness (SR 6) | μm | 60 | 60 | 60 | 60 |
| MDO | TEMPERATUR STRETCHING ROLL(6) | ° C. | 105 | 105 | 105 | 105 |
| tensile MD | TENSILE MODULUS | MPa | 947.3 | 663.62 | 877.09 | 939.58 |
| Tensile TD | TENSILE MODULUS | MPa | 1123.84 | 888.94 | 1059.12 | 1150.06 |
| Elmendorf MD | TEAR RESISTANCE | N | 5.82 | 3.67 | 2.09 | 1.26 |
| | RELATIVE TEAR RESISTANCE | N/mm | 95.69 | 59.29 | 34.03 | 20.01 |
| DDI | F50 | g | 1239 | 816 | 1179 | 1155 |

In table 2, the change from OPE797 to FX1001 increase tear strength significantly thus showing the importance of the invention for thicker films.

The invention claimed is:

1. A multilayer machine direction oriented film comprising at least an (A) layer and (B) layer,
   wherein layer (A) layer comprises at least 50 wt % of a multimodal linear low density polyethylene (LLDPE) having a density of 905 to 935 kg/m$^3$ and an MFR$_2$ of 0.01 to 20 g/10 min which comprises a lower molecular weight (LMW) component and a higher molecular weight (HMW) component;
   wherein said LMW component is an ethylene homopolymer and said HMW component is an ethylene polymer of ethylene with at least two C4-12 alpha olefins;
   wherein layer (B) comprises (i) at least 50 wt % of a multimodal LLDPE copolymer with one comonomer and (ii) a plastomer having a density of less than 905 kg/m$^3$,
   wherein the multimodal LLDPE copolymer and the plastomer are separate components; and
   wherein said film is a stretched film which is uniaxially oriented in the machine direction (MD) in a draw ratio of at least 1:3 and has a film thickness of at least 40 microns after stretching and wherein said film does not comprise a layer in which more than 50 wt % of said layer comprises a polymer component having a melting point (Tm) of 100° C. or less.

2. A film as claimed in claim 1 wherein said HMW component is a terpolymer of ethylene, butene and hexene.

3. A film as claimed in claim 1 wherein layer (A) consists essentially of said multimodal LLDPE.

4. A film as claimed in claim 1, wherein the film is not blocked.

5. A film as claimed in claim 1, wherein the film is asymmetric.

6. A film as claimed in claim 1, wherein the film has a thickness of 40 to 80 microns.

7. A film as claimed in claim 6, wherein the film has an elmendorf tear resistance in the machine direction of at least 2.5 N.

8. A film as claimed in claim 6, wherein the film has a dart drop of at least 450 g.

9. A film as claimed in claim 1 consisting of three layers.

10. A film as claimed in claim 1 consisting of layers (A), (B), and (C), wherein layer (C) comprises a multimodal LLDPE copolymer with one comonomer.

11. A process for the formation of a multilayer film as claimed in claim 1 comprising obtaining
    a first polymeric component comprising a multimodal linear low density polyethylene (LLDPE) having a density of 905 to 935 kg/m$^3$ and an MFR$_2$ of 0.01 to 20 g/10 min which comprises a lower molecular weight (LMW) component and a higher molecular weight (HMW) component; wherein said LMW component is an ethylene homopolymer and said HMW component is an ethylene polymer of ethylene with at least two C4-12 alpha olefins; and
    a second polymeric component comprising (i) at least 50 wt % of a multimodal LLDPE copolymer with one comonomer and (ii) a plastomer having a density of less than 905 kg/m$^3$,
    wherein the multimodal LLDPE copolymer and the plastomer are separate components; and
    extruding the first polymeric component and the second polymeric component to form a multilayer film, said film as a whole having a thickness of 240 microns or more wherein said film is not blocked;
    uniaxially stretching said film in the machine direction (MD) in a draw ratio of at least 1:3 so as to form a film of at least 40 microns in thickness.

12. An article packaged using the film of claim 1.

13. A film as claimed in claim 1, wherein the plastomer has a density of less than 902 kg/m$^3$.

14. A film as claimed in claim 1, wherein the plastomer is from 10 wt % to 45 wt % of layer (B).

* * * * *